United States Patent
Long

[19]

[11] Patent Number: 6,087,777
[45] Date of Patent: Jul. 11, 2000

[54] TURN SIGNAL/BRAKE LIGHT CONVERTERS FOR TOWED VEHICLES

[75] Inventor: Robert E. Long, Lancaster, Pa.

[73] Assignee: New Holland North America, Inc., New Holland, Pa.

[21] Appl. No.: 09/310,206

[22] Filed: May 12, 1999

[51] Int. Cl.⁷ .................................................. B60Q 1/02
[52] U.S. Cl. .............................. 315/82; 315/77; 340/468
[58] Field of Search ................................. 315/82, 77, 83, 315/136; 340/468, 472, 476, 477, 465; 280/422

[56] References Cited

U.S. PATENT DOCUMENTS

| | | | |
|---|---|---|---|
| 3,849,664 | 11/1974 | Bryant | 307/10 LS |
| 3,970,860 | 7/1976 | Purdy | 307/10 LS |
| 4,006,453 | 2/1977 | Bryant | 340/67 |
| 4,270,115 | 5/1981 | Bonnett | 340/67 |
| 4,357,594 | 11/1982 | Ehrlich et al. | 340/72 |
| 4,751,431 | 6/1988 | Ducote | 315/77 |
| 4,939,503 | 7/1990 | Swanson | 340/468 |
| 5,027,031 | 6/1991 | Wheelock | 315/77 |
| 5,030,938 | 7/1991 | Bondzeit | 340/431 |
| 5,498,910 | 3/1996 | Hopkins et al. | 307/10.1 |
| 5,498,929 | 3/1996 | Formwalt, Jr. | 315/77 |
| 5,521,466 | 5/1996 | Vincent | 315/77 LS |
| 5,760,545 | 6/1998 | Mikel | 315/77 |
| 6,002,330 | 12/1999 | Brandt | 340/468 |

*Primary Examiner*—Don Wong
*Assistant Examiner*—Ephrem Alemu
*Attorney, Agent, or Firm*—Griffin & Szipl, P.C.

[57] ABSTRACT

A converter circuit connected between the signal light control system of a towing vehicle and the turn signal and brake lamps of a towed farm implement discriminates between braking signals and turn signals appearing at the same pin positions of a connector receptacle by timing the duration of the signals. In a second embodiment providing for enhanced lighting of farm implements when traveling on public roads, latching relays establish circuits for flashing the brake lamp in the direction of turn. A switch may be provided to enable the enhanced lighting when the towing vehicle is a tractor, or disable the enhanced lighting and permit the implement turn signal and brake lights to mimic the operation of the turn signal and lights on a truck when the towing vehicle is a truck.

10 Claims, 4 Drawing Sheets

TURN SIGNAL/BRAKE LIGHT CONVERTERS FOR TOWED VEHICLES

FIELD OF THE INVENTION

The invention relates to signal converters of the type connected between the brake and turn signal light control system on a towing vehicle and the brake and turn signal lights on a towed vehicle such as a farm implement. Converters according to the invention are responsive to brake and turn signals produced by the signal light control system of a towing vehicle for controlling energization of the brake and turn signal lamps on a farm implement according to ASAE standards for farm implements traveling on public roads.

BACKGROUND OF THE INVENTION

A truck is typically provided with a connector receptacle at the rear and the signal and brake lighting circuits of the truck are connected to the receptacle to provide a connection for energizing the signal and brake lighting circuits of a vehicle which is being towed. A light truck (one ton and under) is usually provided with a 4-position flat connector receptacle wired according to ASAE standard J1239. That is, the signal lght control system in the towing vehicle provides intermittent pulse type signals to connector position 3 when a left turn is signaled and to connector position 4 when a right turn is signaled. When the brakes are applied on the towing vehicle, the signal light control system applies continuous signals to connectors 3 and 4 for as long as the brakes are applied.

On the other hand, road farm implements are typically provided with 7-position connector plugs which connect with 7-position receptacles provided on tractors, these plugs being wired to ASAE standard J560b which requires that connector position 4 be connected to both brake lamps, connector position 3 be connected to the left turn signal lamp, and connector position 5 be connected to the right turn signal lamp. Thus, the pulse type signals appearing at positions 3 and 4 of the 4-position connector must be distinguished from the braking signals at these same positions if the implement lighting system is to be properly controlled.

A somewhat similar problem is raised by ASAE standard 279.10 (1996 revision of ASAE standard 279.9) for the lighting and marking of agricultural equipment when traveling on a public road. Tractors and self-propelled equipment must have two amber warning lights, visible from the front and rear, and flashing in unison at a rate of 60 to 85 flashes per minute. When turn signals are provided the amber warning lights must also serve as turn indicators. The amber light in the direction of the turn must flash and the amber light in the direction opposite the turn must become steady burning. A single 7-position receptacle must be provided, the receptacle conforming to ASAE J560 and having at least positions 1 (ground), 3 (left turn), 5 (right turn), and 6 (tail lights), wired for service.

For towed agricultural implements which obscure illumination of any flashing warning lamp or extremity lamp on a towing vehicle, ASAE 279.9 requires lighting on the implements. At least one tail light is required if the implement obscures a tail light of the towing vehicle. Wide implements or implements extending laterally of the towing vehicle or more than 10m behind the vehicle must have at least two amber flashing warning lamps which flash in unison with the warning lights on the towing vehicle and also serve as turn indicators.

The 1996 revisions are intended to provide enhanced lighting functions. For tractors and self-propelled equipment, these revisions specify that turn indicators must be provided. When a turn is signaled, the amber flashing warning lamp in the direction opposite the direction of turn is to be steady burning. The amber flashing warning lamp in the direction of turn must increase in flashing rate a minimum of 20 flashes per minute, so as to flash at a rate of at least 80 but no greater than 110 flashes per minute. In addition, the red tail lamp or an additional amber lamp must flash in the direction of turn and in unison with the amber flashing warning lamp.

If towed equipment obscures any tail lamp on the towing machine, ASAE 279.10 specifies that the towed equipment shall have two red tail lamps. If a flashing warning lamp on the towing machine is obscured, the towed equipment must have two amber warning lamps which flash in unison with the warning lamps on the towing machine. If a turn indicator on the rear of the towing equipment is obscured, the towed equipment must have turn indicators operating in exactly the same manner as the turn indicators on the towing equipment.

According to ASAE 279.10, positions 3 and 5 of the connector receptacle receive either a pulse type signal or a continuous signal depending on the direction of turn, whereas position 4 receives only a braking signal which is continuous for intervals the brakes are applied. Since the brake lamp in the direction of turn must flash until a turn signal is canceled, it is desirable to be able to determine the types of signals appearing at positions 3 and 5.

U.S. Pat. No. 5,498,929 discloses a system providing enhanced lighting functions on a towed farm implement. This system utilizes a relay to connect one end of both brake light filaments on the towed implement to ground when a turn is signaled, the relay coil being energized by the intermittent difference in voltage magnitude existing between the pulse type signal signaling the direction of turn and the continuous signal signaling the direction opposite the turn. As explained in the patent, the system is sensitive to timing differences between flasher signals as might occur when the flashers are controlled by separate relays in the lighting circuits of the towing vehicles, and an RC delay circuit may be provided to overcome this problem by delaying the energizing of the relay.

SUMMARY OF THE INVENTION

An object of the present invention is to provide converter circuits connectable between the turn signal and brake lamps on a farm implement and the signal light control circuit of a towing vehicle such as a truck or a tractor.

In first embodiment the brake/turn signals appearing at a connector receptacle having four pin positions wired according to ASAE standard J1239 are converted to appropriate brake/turn signals for energizing the turn and brake lamps on the implement that are wired to a J560 connector plug. Timers time the duration of the signals to distinguish between braking signals and flashing event signals (turn signal or hazard warning) appearing on the same leads.

A further object of the invention is to provide a signal converter connectable between the brake and turn signal light control circuit of a towing vehicle and the brake and turn signal lamps on a towed a farm implement, the brake and turn signal light control circuit concurrently producing an intermittent pulse type left turn signal at a first pin position of a connector receptacle and a continuous signal at a second pin position of the receptacle when brakes are applied while a left turn is being signaled, or concurrently producing an intermittent pulse type signal at the second pin position and a continuous signal at the first pin position when brakes are applied while a right turn is being signaled, the farm implement having left and right turn signal lamps and left and right brake lamps, the signal converter comprising first and second timers having outputs connected to first and second relays, respectively; the first and second timers having inputs connectable to the first and second pin positions, respectively; the first and second timers producing output signals to energize the first and second relays, respectively, only when a continuous signal is present at the first or second pin position, respectively; the first and second pin positions being connected through normally closed contacts of the first and second relays, respectively, to the left and right turn signal lamps, respectively, and through normally open contacts of the first and second relays, respectively, to both the left and right brake lamps.

Another object of the invention is to provide a signal converter responsive to brake and turn signals produced by the brake and turn signal light control circuit of a towing tractor for controlling the brake and turn signal lamps on a towed a farm implement, the brake and turn signal light control circuit concurrently producing an intermittent pulse type left turn signal at a first pin position of a connector receptacle and a continuous signal at a second pin position of the receptacle while a left turn is being signaled, concurrently producing an intermittent pulse type right turn signal at the second pin position and a continuous signal at the first pin position while a right turn is being signaled, and a continuous braking signal at a third pin position of the receptacle when the brakes are applied, the farm implement having left and right turn signal lamps and left and right brake lamps, the signal converter comprising: a connector plug having first, second and third pin positions mating with corresponding pin positions of connector receptacle; a left brake drive relay, a left turn latching relay, a right turn latching relay and a right brake drive relay, each relay comprising a solenoid for transferring associated contacts from a normally closed position to a normally open position when the relay is energized; the left and right turn latching relay solenoids being connected in series with first and second diodes, respectively, between the first and second pin positions of the connector plug so that the left turn latching relay or the right turn latching relay is energized when a left turn or a right turn, respectively, is signaled; the contacts of the left turn latching relay establishing a circuit for holding the left turn latching relay and holding the left brake drive relay energized when the left turn latching relay is energized, and the contacts of the right turn latching relay establishing a circuit for holding the right turn latching relay and holding the right brake drive relay energized when the right turn latching relay is energized; the contacts of the left brake drive relay closing a circuit between the first pin position of the connector plug and the left brake lamp when the left brake drive relay is energized; and, the contacts of the right brake drive relay closing a circuit between the second pin position of the connector plug and the right brake lamp when the right brake drive relay is energized.

Other objects and advantages of the invention will become obvious upon consideration of the following description and the accompanying drawings.

DESCRIPTION OF PREFERRED EMBODIMENTS

Figure 1:
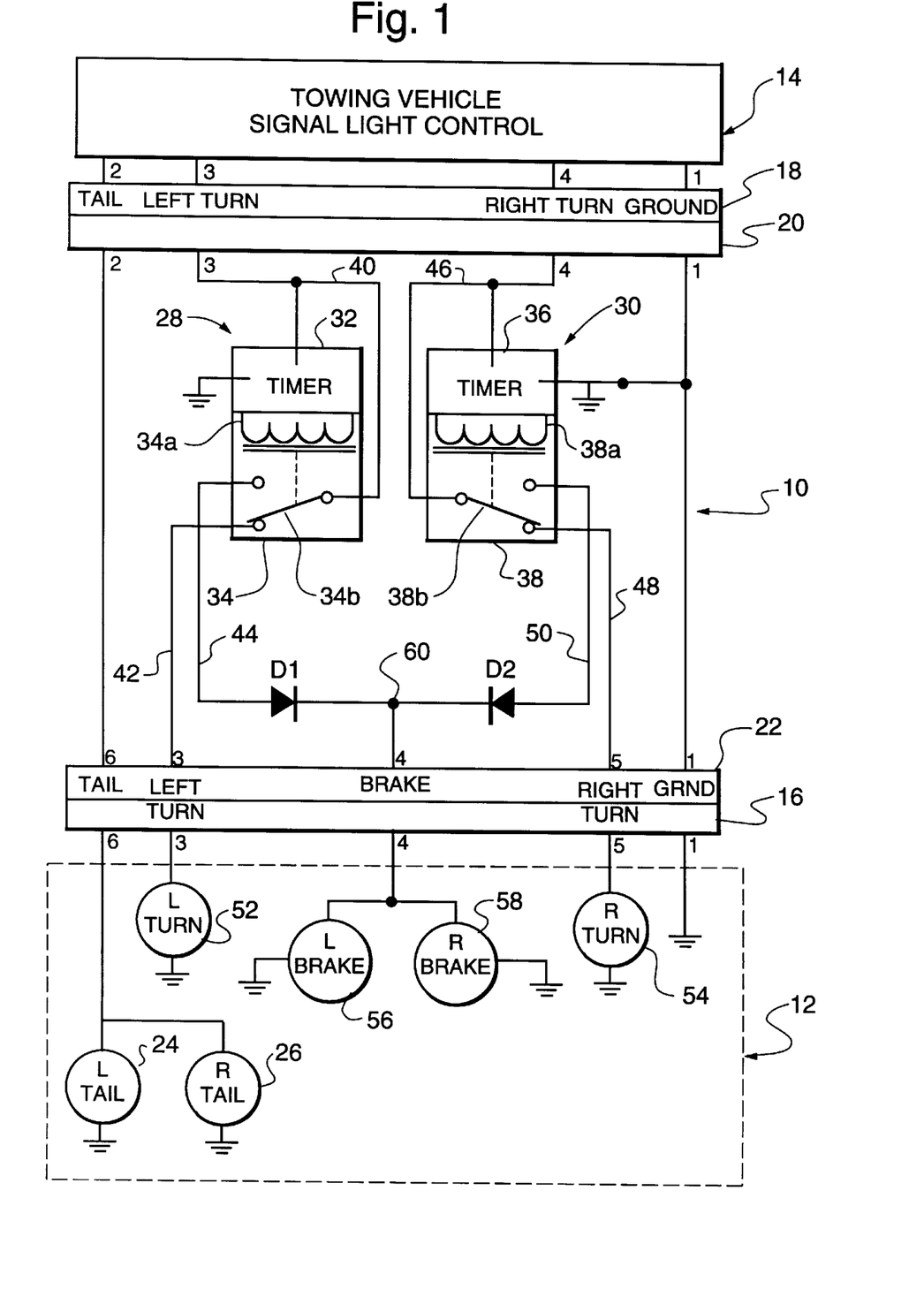
FIG. 1 is a circuit diagram of a converter circuit for adapting the control signals available at a 4-position connector receptacle on a towing vehicle for control of the signal lights on a towed vehicle having a 7-position connector plug.

FIG. 1 illustrates a first embodiment of the invention wherein a converter circuit or adaptor 10 adapts the brake, warning and turn signal lighting system 12 on a towed vehicle for operation by the signals produced by the brake, warning and turn signal control circuits 14 of a towing vehicle. While useful in many different applications, adaptor 10 is particularly useful in the case where the towed vehicle is a farm implement such as a mower or manure spreader wired with a standard 7-position circular connector plug according to ASAE specification J560b and the towing vehicle is a light (one ton or under) pickup truck wired to a 4-position flat connector receptacle 18 according to ASAE specification J1239.

Adapter 10 comprises a 4-pin flat connector plug 20 having pins positioned for insertion into the connector receptacle 18, and a 7-position connector receptacle 22 for receiving the pins of the connector plug 16 connected to the brake and turn signal lights 12 of the towed implement.

The vehicle signal control circuits 14 are conventional and generate intermittent pulse type signals having an on-time duration of less than about 0.5 second to signal a flash event (left turn, right turn or flasher warning) when a turn signal switch or a hazard warning switch (not shown) is closed. According to ASAE specification J1239, the left and right turn signals are wired to pin positions 3 and 4, respectively, of receptacle 18 and the flasher signal is applied to both pin positions 3 and 4.

Signal control circuits 14 produce a braking signal which, in the absence of a concurrent flash event signal, is continuous during intervals when the vehicle brakes are applied. According to ASAE specification J1239, the braking signal is also wired to both pin positions 3 and 4 of receptacle 18. The circuits 14 include a conventional cancellation means which, when a flashing event occurs concurrently with a braking event, cancels the braking signal on the side which is to signal the flashing event. For example, if the circuits 14 are signaling a left turn and the brakes are applied, the braking signal is applied to pin position 4 but the braking signal to pin position 3 is canceled so that left turn signal only is applied to pin 3.

Circuits 14 also provide a tail light signal which is applied to pin position 2 of receptacle 18 when a head light switch (not shown) is turned on. Pin position 1 of receptacle 18 is connected to chassis ground on the towing vehicle.

Within adaptor 10, pin 1 of plug 20 is connected to position 1 of receptacle 22 and pin 1 of plug 16 is connected to chassis ground on the towed implement. Pin 2 of plug 20 is connected to position 6 of receptacle 22 and pin 6 of plug 16 is connected in parallel to the left and right tail lights 24 and 26.

A primary function of adaptor 10 is to distinguish the intermittent pulse type (less than about 0.5 sec.) flashing event signals appearing at pin positions 3 and 4 of receptacle 18 from "continuous" (longer than about 0.5 sec) braking event signals appearing at the same positions. Adaptor 10 includes a first time delay relay (TDR) 28 for detecting whether the signal at position 3 represents a flashing event (left turn or hazard warning) or a braking event and a second time delay relay 30 for detecting whether the signal at position 4 represents a flashing event (right turn or hazard warning) or a braking event.

TDR 28 comprises a timer circuit 32 having an input connected via a lead 40 to pin 3 of plug 20 and an output connected to the solenoid 34a of a relay 34 having contacts 34b. The operating contact of contacts 34b is connected to pin 3 of plug 20 by lead 40, the normally closed contact is connected to position 3 of receptacle 22 via a lead 42, and the normally open contact is connected via a lead 44 and a diode D1 to position 4 of receptacle 22.

Timer circuit 32 may be an RC circuit or other form of timer circuit which delays a signal applied to its input and produces an output signal only if the input signal has a duration greater than the on-time of a flashing event signal.

TDR 30 detects whether the signal at pin position 4 of receptacle 18 represents a flashing event (right turn or hazard warning) or a braking event. TDR 30 comprises a timer circuit 36 having an input connected via a lead 46 to pin 4 of plug 20 and an output connected to the solenoid 38a of a relay 38 having contacts 38b. The operating contact of contacts 38b is connected to pin 4 of plug 20 by a lead 46, the normally closed contact is connected to position 5 of receptacle 22 via a lead 48, and the normally open contact is connected via a lead 50 and a diode D2 to position 4 of receptacle 22.

The purpose of diodes D1 and D2 is to prevent feedback of the braking signal on one side to the timer circuit on the opposite side.

The adapter 10 functions as follows. When a left turn or a hazard warning is to be signaled, control circuit 14 produces intermittent pulses of less than about 0.5 sec. at pin position 3 of receptacle 18. These pulses pass over lead 40, through the contacts 34b (now closed), and over lead 42 to intermittently energize or flash the amber left turn signal light 52 on the towed vehicle. The solenoid 34a is not energized because the duration of the energizing pulses is less than the delay time of timer 32.

In like manner, when a right turn or hazard warning is to be signaled, control circuit 14 produces intermittent pulses at pin position 4 of receptacle 18 and these pulses pass over lead 46, through the contacts 38b (normally closed), and over lead 48 to intermittently energize or flash the amber right turn signal light 54. The solenoid 38a is not energized because the duration of the energizing pulses is less than the delay time of timer 30.

When the brakes of the towing vehicle are applied, a braking signal appears at pin positions 3 and 4 of receptacle 18 and is applied to both timers 32 and 36 via leads 40 and 46, respectively. If the duration of the braking signal is greater than the delay time of timers 32 and 36, the timers produce output signals to energize solenoids 34a and 38a thereby transferring contacts 34b and 38b. The braking signal on lead 40 then passes through contacts 34b, over lead 44 and through diode D1 to a junction point 60 while the braking signal on lead 46 passes through contacts 38b, over lead 50 and through diode D2 to the junction point. Junction point 60 is connected to pin position 4 of receptacle 22 so that the braking signal energizes the red brake lights 56 and 58 on the towed vehicle.

Under the condition where a braking event occurs concurrently with a turn event, the turn event is signaled by a flashing amber light on the side of the implement to which the turn will be made, and the braking event is signaled on the implement by continuous energization of the red brake lights 56 and 58. For example, if a right turn is signaled and the brakes are applied, the brake signal appearing at pin position 3 only of receptacle 18 acts through timer 32 to energize solenoid 34a and transfer contacts 34b. The brake signal from pin position 3 then passes via lead 40, the contacts 34b, lead 44, diode D1 and junction 60 to energize both brake lights 56 and 58. At the same time, the right turn signal at pin 4 of receptacle 18 is applied to timer 36 and through contacts 38b and lead 48 to the amber right turn lamp 54. Because the pulses of the right turn signal are shorter in duration than the delay of timer 36, the timer never produces an output signal to energize the solenoid of relay 38.

Figure 2:
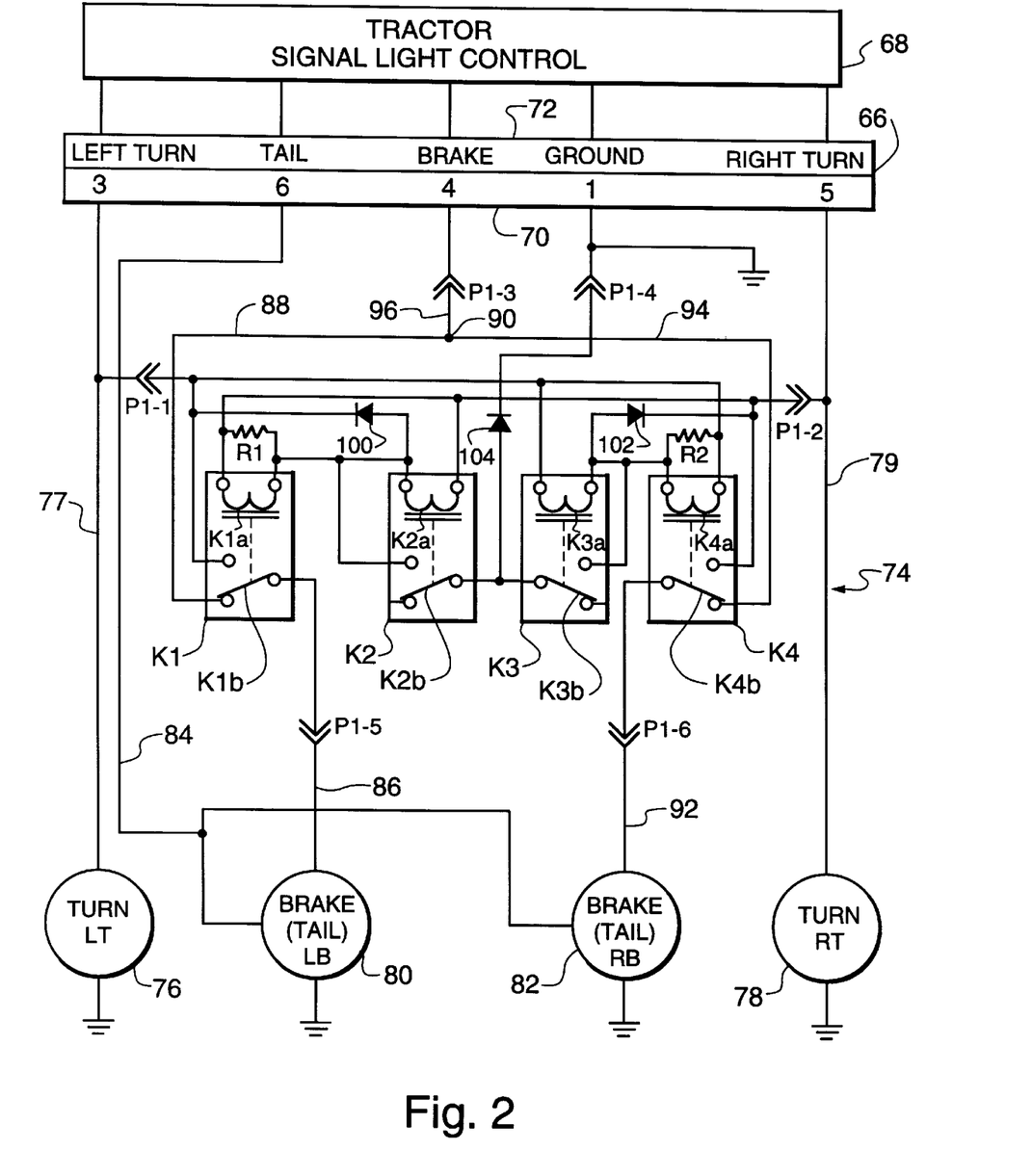
FIG. 2 is a circuit diagram of a converter circuit for adapting the control signals available at a connector receptacle on a tractor to provide enhanced signal lighting on a towed agricultural implement.

FIG. 2 illustrates an embodiment of the invention providing the enhanced highway lighting functions for agricultural implements as required by ASAE specification 279.10 when towed by a tractor on a highway. This embodiment comprises a 7-position connector plug 70 carried on the implement for mating with the 7-position connector receptacle 72 carried by a tractor having signal light control circuits 68 providing signals to the receptacle as required by S279.10. A first amber lamp 76 is provided for signaling a hazard warning or left turn and a second amber lamp 78 is provided for signaling a hazard warning or right turn. Left turn lamp 76 is connected to pin 3 of connector plug 70 by a lead 77 and the right turn lamp 78 is connected to pin 5 by a lead 79 so that one or the other or both of these lamps flash in unison with the lamps on the tractor or towing vehicle to signal a turn or hazard warning. When the tractor signals a left turn, the intermittent pulse signal on lead 77 causes left turn lamp 76 to flash. At the same time, the tractor produces a continuous signal which passes over lead 79 so that the right turn lamp 78 is continuously energized until the turn is canceled. Conversely, when the tractor signals a right turn it produces pulses which pass over lead 79 to flash the right turn lamp 78, and concurrently produces a continuous signal which passes over lead 77 so that the left turn lamp 76 is continuously energized until the turn signal is canceled.

Two dual filament red lamps 80 and 82 are provided. One filament in each lamp 80 and 82 is provided for signaling a braking event. The second filament in each of lamps 80 and 82 implements the tail light function. If desired, two single filament tail lamps and two single filament brake lamps may be substituted for lamps 80 and 82. The tail light filaments are connected to pin 6 of connector plug 70 via a lead 84.

The brake light filament of the left brake lamp 80 is connected to pin 4 of connector plug 70 via a lead 86, normally closed relay contacts K1b, and lead 88 to a junction 90 whereas the brake light filament of right brake lamp 82 is connected to junction 90 via a lead 92, relay contacts K4b and a lead 94. Junction 90 receives a continuous braking signal via a lead 96 from pin 4 of connector plug 70 during each interval that the tractor brakes are applied. This signal energizes both brake Lamps 80 and 82 provided contacts K1b and K4b remain closed.

The adapter circuits 74 for enabling the enhanced implement lighting functions required by S279.10 include a left brake drive relay K1, a left turn latching relay K2, a right turn latching relay K3, and a right brake drive relay K4 having solenoids K1a, K2a, K3a and K4a, respectively, for operating relay contacts K1b, K2b, K3b and K4b, respectively.

Pin 3 of connector plug 70 is connected to first ends of the solenoids K3a and K4a and to the normally open side of contacts K1b. Pin 5 of connector plug 70 is connected to the first ends of solenoids K1a and K2a and to the normally open side of contacts K4b. The second ends solenoids K1a and K2a are tied together and connected to the normally open side of contacts K2b and also through a diode 100 to pin 3 of connector plug 70. In like manner, the second ends of solenoids K3a and K4a are tied together and connected to the normally open side of contacts K4b and pin 5 of connector plug 70 through a diode 102.

The purpose of diodes 100 and 102 in FIG. 2 is to isolate the left or right turn signals from the ground paths for relay coils K2a and K3a. Diode 104 is not required but, if used, provides reverse polarity protection. Resistors R1 and R2, connected across relay coils K1a and K4a, respectively, serve to suppress transients.

The converter shown in FIG. 2 operates as follows. When the control circuits 68 signal a left turn, they initially produce a high level signal at both pin positions 3 and 5 of connector 66. This applies a high level signal to both ends of each of the solenoids K1a–K4a so the solenoids are not actuated to transfer their associated contacts. At this time both the left and right turn lamps 76 and 78 are energized for a short interval less than 0.5 sec. After a short interval the signal at connector position 3 goes low (position 5 remains high) and solenoids K1a and K2a are energized by a circuit from pin 5, through the solenoids and diode 100 to lead 77 which appears as ground through the filament of lamp 76.

When solenoid K2a is energized, it transfers contacts K2b. This completes a latching circuit which extends from pin 5 through solenoid K2a, contacts K2b (now closed), and diode 104 to ground. The latching circuit keeps solenoid K2a energized until the turn signal is canceled by control circuit 68.

When contacts K2b close, they also complete a circuit from pin 5, through solenoid K1a and contacts K2b to ground thus keeping solenoid K1a energized. When solenoid K1a is energized it transfers contacts K1b. A circuit is thus completed from pin 3 through contacts K1b to the left brake light filament in lamp 80. Thereafter, and until the turn signal is canceled, the pulses of the left turn signal energize the left brake light so that it flashes in unison with the left turn lamp 76. Meanwhile, the right turn lamp remains continuously energized by the steady high level signal at pin 5. If the vehicle brakes are applied while the turn is being signaled, the brake signal at pin 4 passes through the normally closed contacts K4b to energize the right brake light filament in lamp 82.

When the left turn signal is canceled, the circuits 68 again cause intermittent pulses to appear in unison at pins 3 and 5. When the first low level occurs, solenoids K1a and K2a are de-energized and their contacts return to the positions shown in FIG. 2.

Operation of the circuit when signaling a right turn is obvious from the foregoing description. Solenoids K3a and K4a operate during signaling of a right turn in the same way as solenoids K2a and K1a, respectively, operate during a left turn.

The embodiment shown in FIG. 2 is easily adapted for use when the implement is being towed by a tractor or a large (over one ton) truck. A manually actuated throw switch 110 (FIG. 3) may be provided to select a tractor mode in which the lights on the implement function according to the enhanced lighting standards discussed above, or a truck mode in which the lights on the implement function normally, that is, they mimic or act in exactly the same way as the turn signal and brake lights on the truck towing the implement.

Figure 3:
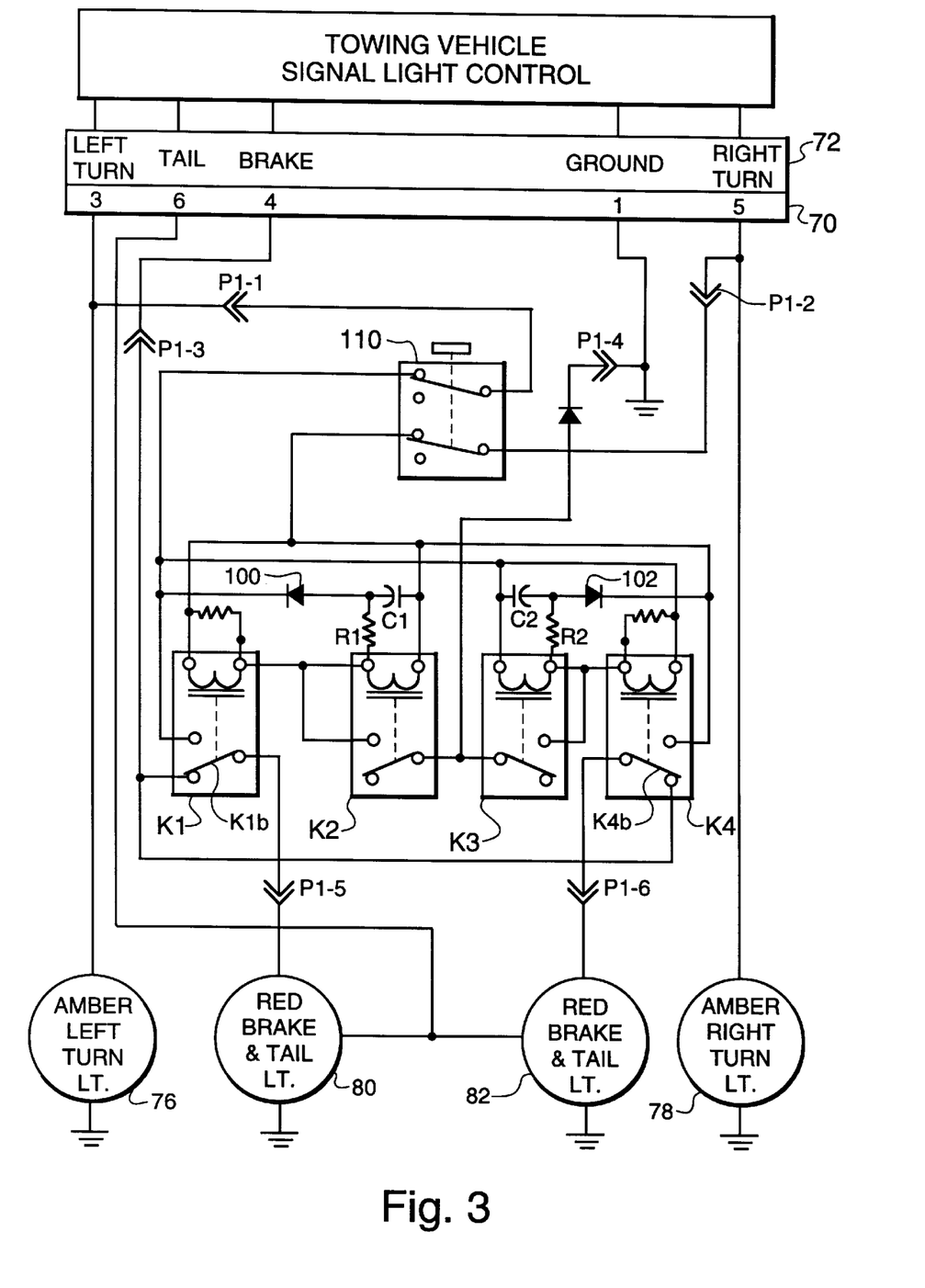
FIG. 3 is a circuit diagram of a converter circuit with a manual switch for adapting the circuit for use with a tractor or a truck; and, FIG. 4 is a circuit diagram similar to that of FIG. 3 wherein the manual switch is replaced by a time delay relay.

FIG. 3 illustrates switch 110 set for the tractor mode. When the switch is set in a first state as shown in FIG. 3 and the connector plug 70 is plugged into the receptacle 72 on a tractor, relays K1–K4 function in exactly the same way as the relays K1–K4 shown in FIG. 2.

When switch 110 is set to a second state and connector plug 70 is plugged into the receptacle 72 on a truck, the switch contacts open to break the circuits extending from pin positions 3 and 5 to relays K1–K4. This prevents turn signals appearing at pin positions 3 and 5 from energizing the relays. Left and right turn signals appearing at pin positions 3 and 5, respectively, of connector plug 70 are applied directly to the left and right turn signal lamps 76 and 78, respectively. On trucks, a braking event does not cause modification of an intermittent turn signal appearing at pin position 3 or 5 hence turn signal lamps 76 and 78 are not affected by braking. Brake signals appearing at pin position 4 pass through relay contacts K1b and K4b and are applied to the brake light filaments of brake lamps 80 and 82.

Figure 4:
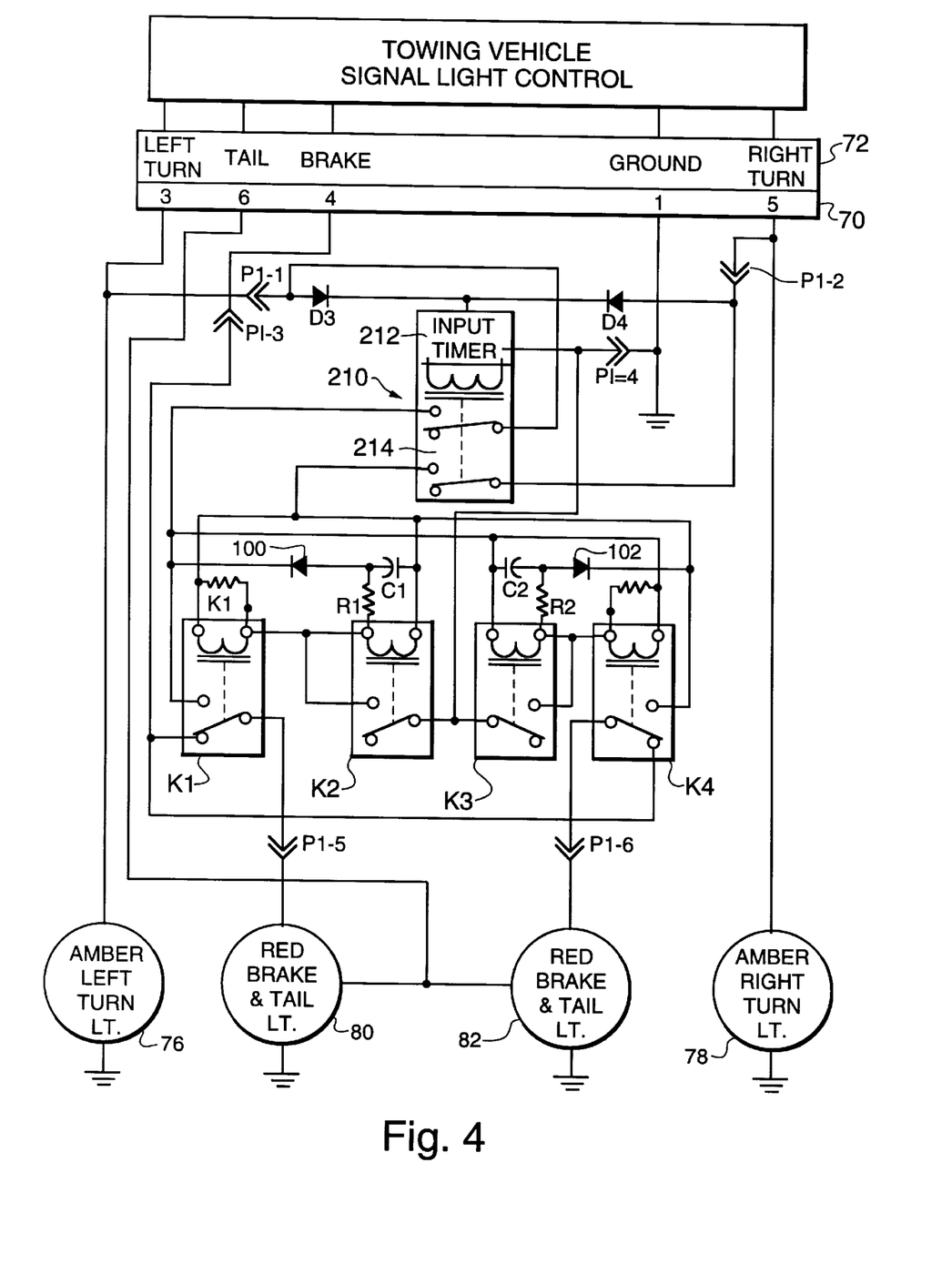

The manual switch 110 may be replaced with a switch in the form of a time delay relay (TDR) 210 as shown in FIG. 4 that automatically detects whether the connector plug 70 is plugged into the connector receptacle of a tractor or a truck. TDR 210 comprises an on-delay timer 212 having an input connected through diodes D3 and D4 to pin positions 3 and 5 of connector plug 70, and an output connected to the coil of a relay 214. TDR 210 may be the same as the TDRs 28 and 30 described with reference to FIG. 1.

FIG. 4 shows the state of the relay contacts when the relay 210 is not energized. In this state, which corresponds to the truck mode, the contacts of relay 214 are open so that relays K1–K4 can not be energized. Intermittent left and right turn signals appearing at pin positions 3 and 5, respectively, of connector plug 70 are applied to the left and right turn signal lamps 76 and 78, respectively to control intermittent flashing. The turn signals are also applied through diodes D3 and D4 to the input of timer 212. When the towing vehicle is a truck, the duration of the turn signal pulses is less than the on-time delay of timer 212 so the timer never produces an output pulse to energize relay 214. When the truck brakes are applied, the braking signal appearing at pin position 4 of connector plug 70 is applied through the normally closed contacts of relay K1 to the filament of the left brake light 80 and through the normally closed contacts of relay K4 to the filament of the right brake light 82.

When the towing vehicle is a tractor, the converter shown in FIG. 4 automatically provides the enhanced lighting functions described with reference to FIG. 2. Depending on the direction of turn, the tractor produces a continuous signal at one of pin positions 3 and 5 and an intermittent signal at the other of these pin positions. A continuous signal at pin position 3 passes through diode D3, or a continuous signal at pin position 5 passes through diode D4, to the input of the timer 212. When the duration exceeds the on-time delay of timer 212, the timer produces an output signal to energize relay 214. When the relay is energized its contacts transfer thus connecting relays K1–K4 to pin positions 3 and 5 in the same way as shown in FIG. 2. Relays K1–K4 then respond to the turn signals in exactly the same way as described with reference to FIG. 2 to provide the enhanced signal lighting functions.

As shown in FIGS. 3 and 4, relay K2 may be provided with a signal delay circuit comprising a resistor R1 and a capacitor C1 and relay K3 may be provided with a similar delay circuit comprising a resistor R2 and a capacitor C2. As explained in U.S. Pat. No. 5,498,929, signal delay circuits may be provided to assure that slight timing differences in the left and right side flasher or warning signals do not cause improper operation. However, unlike the prior art device, such timing differences in the present invention may, at most, affect only one flasher cycle. The effect is hardly noticeable hence it is preferable not to provide the signal delay circuits even though there may be a timing difference in the flasher signals.

The embodiments of the converter shown in FIGS. 2–4 may be provided with a connector P1. This connector permits easy disconnection of relays K1–K4 and also the switch 110 or TDR 210 if present. The three embodiments are thus interchangeable on a given implement and a given converter may be disconnected at P1 and moved from one implement to another.

Preferred embodiments have been described in detail to illustrate the principles of the invention. It will be understood that various modifications and substitutions may be made in the described embodiments without departing from the invention as defined by the appended claims. For example, the relays K1–K4 of FIG. 2 may be controlled through two time delay relays such the time delay relays 28 and 30 of FIG. 1. In this arrangement the relays K1 and K2 cycle when a right turn is being signaled and relays K3 and K4 cycle when a left turn is being signaled. These are merely mechanical cycles as the contacts do not experience loading, and do not detract significantly from the useful relay life.

I claim:

1. A signal converter connectable between the brake and turn signal light control circuit of a towing vehicle and the brake and turn signal lamps on a towed a farm implement, the brake and turn signal light control circuit concurrently producing an intermittent pulse type left turn signal at a first pin position of a connector receptacle and a continuous signal at a second pin position of the receptacle when brakes are applied while a left turn is being signaled, or concurrently producing an intermittent pulse type signal at the second pin position and a continuous signal at the first pin position when brakes are applied while a right turn is being signaled, the farm implement having left and right turn signal lamps and left and right brake lamps, said signal converter comprising:

first and second timers having outputs connected to first and second relays, respectively;

said first and second timers having inputs connectable to said first and second pin positions, respectively;

said first and second timers producing output signals to energize said first and second relays, respectively, only when a continuous signal is present at said first or second pin position, respectively;

said first and second pin positions being connected through normally closed contacts of said first and second relays, respectively, to said left and right turn signal lamps, respectively, and through normally open contacts of said first and second relays, respectively, to both said left and right brake lamps.

2. A signal converter as claimed in claim 1 wherein said connector receptacle is a 4-position receptacle and said signal converter includes a 4-position connector mating with said receptacle, the inputs of said first and second timers being connected to said connector plug.

3. A signal converter as claimed in claim 2 wherein the left and right turn signal lamps and the brake lamps are connected to a 7-position connector plug, the signal converter further comprising a 7-position connector receptacle mateable with the 7-position connector plug, the normally open contacts of the first and second relays being connected to said brake lamps and the normally closed contacts of the first and second relays being connected to the left and right turn signal lamps through the 7-position connector receptacle.

4. A signal converter responsive to brake and turn signals produced by the brake and turn signal light control circuit of a towing tractor vehicle for controlling the brake and turn signal lamps on a towed a farm implement, the brake and turn signal light control circuit concurrently producing an intermittent pulse type left turn signal at a first pin position of a connector receptacle and a continuous signal at a second pin position of the receptacle while a left turn is being signaled, concurrently producing an intermittent pulse type right turn signal at the second pin position and a continuous signal at the first pin position while a right turn is being signaled, and a continuous braking signal at a third pin position of the receptacle when the brakes are applied, the farm implement having left and right turn signal lamps and left and right brake lamps, said signal converter comprising:

a connector plug having first, second and third pin positions mating with corresponding pin positions of the connector receptacle;

a left brake drive relay, a left turn latching relay, a right turn latching relay and a right brake drive relay, each relay comprising a solenoid for transferring associated contacts from a normally closed position to a normally open position when the relay is energized;

the left and right turn latching relay solenoids being connected in series with first and second diodes, respectively, between the first and second pin positions of the connector plug so that said left turn latching relay or said right turn latching relay is energized when a left turn or a right turn, respectively, is signaled;

the contacts of the left turn latching relay establishing a circuit for holding the left turn latching relay and holding the left brake drive relay energized when the left turn latching relay is energized, and the contacts of the right turn latching relay establishing a circuit for holding the right turn latching relay and holding the right brake drive relay energized when the right turn latching relay is energized;

the contacts of the left brake drive relay closing a circuit between the first pin position of the connector plug and the left brake lamp when the left brake drive relay is energized; and, the contacts of the right brake drive relay closing a circuit between the second pin position of the connector plug and the right brake lamp when the right brake drive relay is energized.

5. A signal converter as claimed in claim 4 wherein the left and right brake lamps are connected to the third pin position of the connector plug through normally closed contacts of the left brake drive relay and the right brake drive relay, respectively.

6. A signal light converter as claimed in claim 5 wherein the left turn lamp and the right turn lamp are directly connected to the first and second pin positions, respectively of the connector plug.

7. A signal light converter as claimed in claim 5 wherein the left and right brake drive relays and the left and right latching relays are connected through a further connector to the connector plug, the brake lamps and the left and right turn lamps so that all relays are easily replaceable.

8. A signal converter as claimed in claim 4 and further comprising a switch for selecting a tractor mode or a truck mode so that the left and right turn lamps and the brake lamps on the implement may mimic the left and right turn lamps and the brake lamps on a truck when the implement is towed by the truck and the switch is set to the truck mode.

9. A signal converter as claimed in claim 8 wherein said switch comprises a manually operated switch having first and second sets of contacts connected at one side to the third and fifth pin positions, respectively, and connected at a second side to the left latching relay and the right latching relay, the first and second sets of contacts being closed when said switch is set to the tractor mode.

10. A signal converter as claimed in claim 8 wherein said switch comprises a timer connected to the third and fifth pin positions of said connector plug, said timer producing an output signal only when the connector plug is mated with a connector receptacle of a tractor and the brake and turn signal control circuit of the tractor signals a right turn or a left turn, and a mode relay having first and second sets of contacts connected at one side to the third and fifth pin positions, respectively, of the connector plug and connected at a second side to the left latching relay and the right latching relay, the mode relay being responsive to an output signal from said timer to close said first and second sets of contacts.

\* \* \* \* \*